Feb. 19, 1929.
J. M. LARSON
ANIMAL CONTROLLER
Filed July 26, 1927
1,702,697
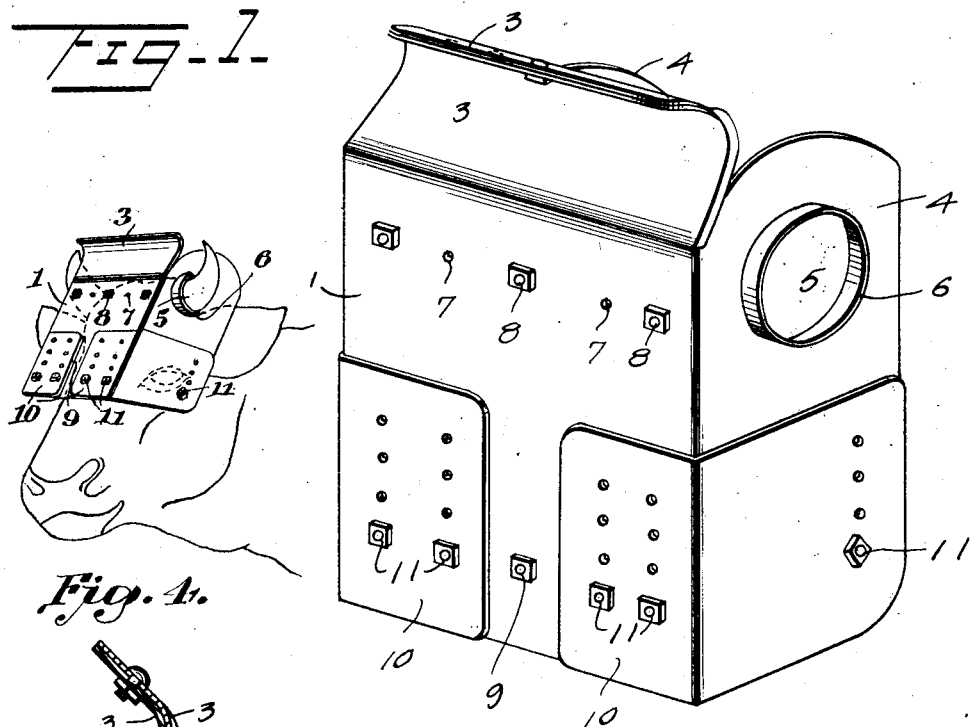
Fig. 1.
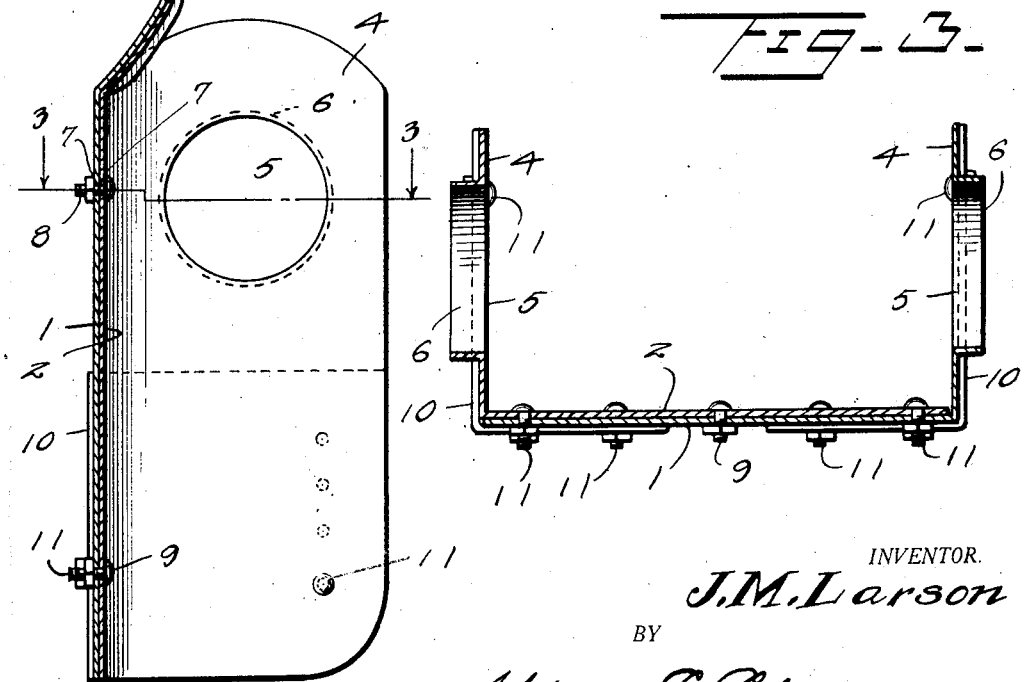
Fig. 2.
Fig. 3.
INVENTOR.
J. M. Larson
BY
Watson E. Coleman ATTORNEY.

Patented Feb. 19, 1929.

1,702,697

UNITED STATES PATENT OFFICE.

JOHN MARTIN LARSON, OF BURBANK, SOUTH DAKOTA.

ANIMAL CONTROLLER.

Application filed July 26, 1927. Serial No. 208,605.

This invention relates to means for controlling horned animals, and particularly to a blinder or mask, and an object of the invention is to provide an attachment adapted to be applied upon and be supported by the horns of the animal and which hangs over the forward portion of the forehead and partially obstructs the eyes of the animal so that the animal cannot see to make a charge or carry on other vicious head movements.

In the drawings

Figure 1 is a perspective view of the animal mask or blinder,

Fig. 2 is a vertical sectional view thereof, and

Fig. 3 is a horizontal sectional view thereof cut on the line 3—3 of Fig. 2.

Figure 4 is a perspective view showing my device applied.

As illustrated in the accompanying drawing, the mask or blinder comprises overlapping face plates 1 and 2, said plates being provided at their upper edges with curved flanges 3 adapted to interfit one within the other. Each plate is provided at its side edge with a blind panel 4 and the said panels are provided adjacent their upper ends with openings 5, the centers of which are located upon the median longitudinal dimensions of the respective panels 4. The material which is removed from the bodies of the panels 4 to form the openings 5 therein, is outwardly flanged to form bearings through which the horns of the animal may be passed to thereby support the mask or blinder from the horns of the animal. Each of the plates 1 and 2 is provided at its upper portion with a series of openings 7 and the said openings of the respective plates are adapted to register with each other and receive bolts, 8, whereby the said plates 1 and 2 are held fixed and in adjusted positions with relation to each other, thus permitting the transverse breadth of the device to be varied.

The lower portions of the plates are connected by means of a bolt 9. Angle plates 10 are applied to the exterior surfaces of the lower portions of the outermost face plate and blind panel 4, and the said angle plates are adjustably secured to the said parts by means of bolts 11. The angle plates 10 prevent the lower portions of the parts from spreading with relation to each other, and also make it possible to contract the lower portion of the mask, so that the lower end of the device may fit closely against the intermediate portion of the head of the animal.

The device is especially adapted to be used upon the head of a vicious bull in order to prevent the bull from charging. The device is applied by separating the plates 1 and 2 from each other, and by passing the horns of the animal through the openings 5 of the blind panels 4. Thus the blind panels 4 lie at the sides of the head and they hang pendant upon the horns of the animal. The bearing flanges 6 serve as bearing surfaces to prevent the edges of the openings in the blind panels from cutting the horns of the animal. The curved flanges 3 lie over the top of the head of the animal, and serve to check the swinging movement of the device upon the head.

The plates 1 and 2 are secured together by means of bolts 8 and the lower portions of the blind panels 4 may be drawn toward each other and caused to fit snugly against the sides of the head of the animal and when properly adjusted are secured by the application of the angle plates 10, using the securing bolts 11 in a usual manner. When applied, the blind panels 4 will extend slightly below the horizontal line of vision of the animal when the head is erect. Thus the application of the device to the head does not interfere with the vision of the animal when the head is up. Should the animal lower the head in order to make a charge, or for other vicious purposes, the mask will swing downward and forward upon the horns of the animal, thus swinging the blinder panels forward so as to interfere with vision and preventing the animal from seeing the object, and this will tend to prevent the animal from charging.

Having described the invention, what is claimed, is:

1. An animal mask comprising overlapping plates provided at their side edges with blind panels having openings adapted to receive the horns of an animal, means for fixing the plates with relation to each other, the plates being provided at their upper edges with interfitting flanges, said flanges being curved transversely.

2. An animal mask comprising overlapping plates provided at their side edges with blind panels having openings adapted to receive the horns of an animal, and means for fixing the plates with relation to each other, and angle plates applied to the lower portions of the overlapping plates and the blind panels.

3. An animal mask formed to extend downward over the front of the head and partly over the side of the head and having apertures in the sides through which the horns of the animal may pass whereby the mask is supported upon the horns for swinging movement.

4. An animal mask comprising overlapping face plates laterally adjustable upon each other and having at their side margins rearwardly extending blind panels having openings at their upper ends for the reception of the horns of the animal, and means for holding said plates in adjusted relation to each other.

5. An animal mask formed to provide a face portion and lateral blinder portions, the lateral portions of the mask being formed with openings adapted to receive the horns of an animal, said openings being bounded by outstanding flanges.

6. An animal mask comprising overlapping face plates, the face plates at their lateral margins being extended rearward and formed with openings adapted to receive the horns of an animal, the face plates being laterally adjustable upon each other, and means for holding the plates in adjusted relation to each other, said plates at their upper margins being provided with upwardly curved portions which interfit each other.

In testimony whereof I hereunto affix my signature.

JOHN MARTIN LARSON.